(12) United States Patent
Draper

(10) Patent No.: US 6,473,945 B1
(45) Date of Patent: Nov. 5, 2002

(54) FLANGE CLAMP

(75) Inventor: Timothy Charles Draper, East Grinstead (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/650,791

(22) Filed: Aug. 30, 2000

(30) Foreign Application Priority Data

Sep. 3, 1999 (GB) .............................................. 9920932

(51) Int. Cl.⁷ ............................ F16G 15/12; F16L 23/06
(52) U.S. Cl. ............................ 24/271; 24/273; 24/270; 59/185; 285/234
(58) Field of Search ........................... 24/271, 270, 273, 24/19; 285/411, 234; 59/184, 185

(56) References Cited

U.S. PATENT DOCUMENTS

| 764,659 | A | * | 7/1904 | Coleman | ..................... 24/271 |
| 916,169 | A | * | 3/1909 | Langford | ..................... 24/271 |
| 1,804,701 | A | * | 5/1931 | Mojonnier | ..................... 59/185 |
| 2,775,806 | A | * | 1/1957 | Love | ..................... 24/273 |
| 3,464,722 | A | | 9/1969 | Larkin | |
| 4,438,958 | A | * | 3/1984 | DeCenzo | ..................... 285/234 |
| 4,473,365 | A | | 9/1984 | Lapeyre | |
| 4,815,270 | A | * | 3/1989 | Lapeyre | ..................... 59/84 |
| 5,707,089 | A | | 1/1998 | Heinrich | |
| 5,713,737 | A | * | 2/1998 | Sundstrom et al. | ......... 433/139 |

FOREIGN PATENT DOCUMENTS

DE          197 50 251        6/1999

* cited by examiner

Primary Examiner—Victor Sakran
(74) Attorney, Agent, or Firm—Joshua L. Cohen; Salvatore P. Pace

(57) ABSTRACT

A flexible clamp comprising a plurality of plastics links each link being a snap-fit with the next adjacent link thereby permitting a user to alter the length of the chain by the addition or subtraction of one or more links, and means for latching the free ends of the chain together.

6 Claims, 3 Drawing Sheets

FLANGE CLAMP

FIELD OF THE INVENTION

This invention relates to flange clamps and, in particular, to multi-link flexible clamps for securing together the ends of two opposed flanged pipes.

BACKGROUND OF THE INVENTION

Flange clamps are known and used, for example, in the vacuum technology industry which consist of two C-shaped collar halves which are pivoted together for fitting over and around the flanges of two pipes to be connected together and are secured together with a swing bolt.

Flange clamps in the form of a chain are also used and offer the advantage that the clamping forces are uniform around the flanges and are easy and relatively quick to fit.

However, known clamps are designed for specific flange sizes and do not offer versatility in terms of their being suitable for other sizes of flange.

DETAILED DESCRIPTION OF THE INVENTION

Figure 1:
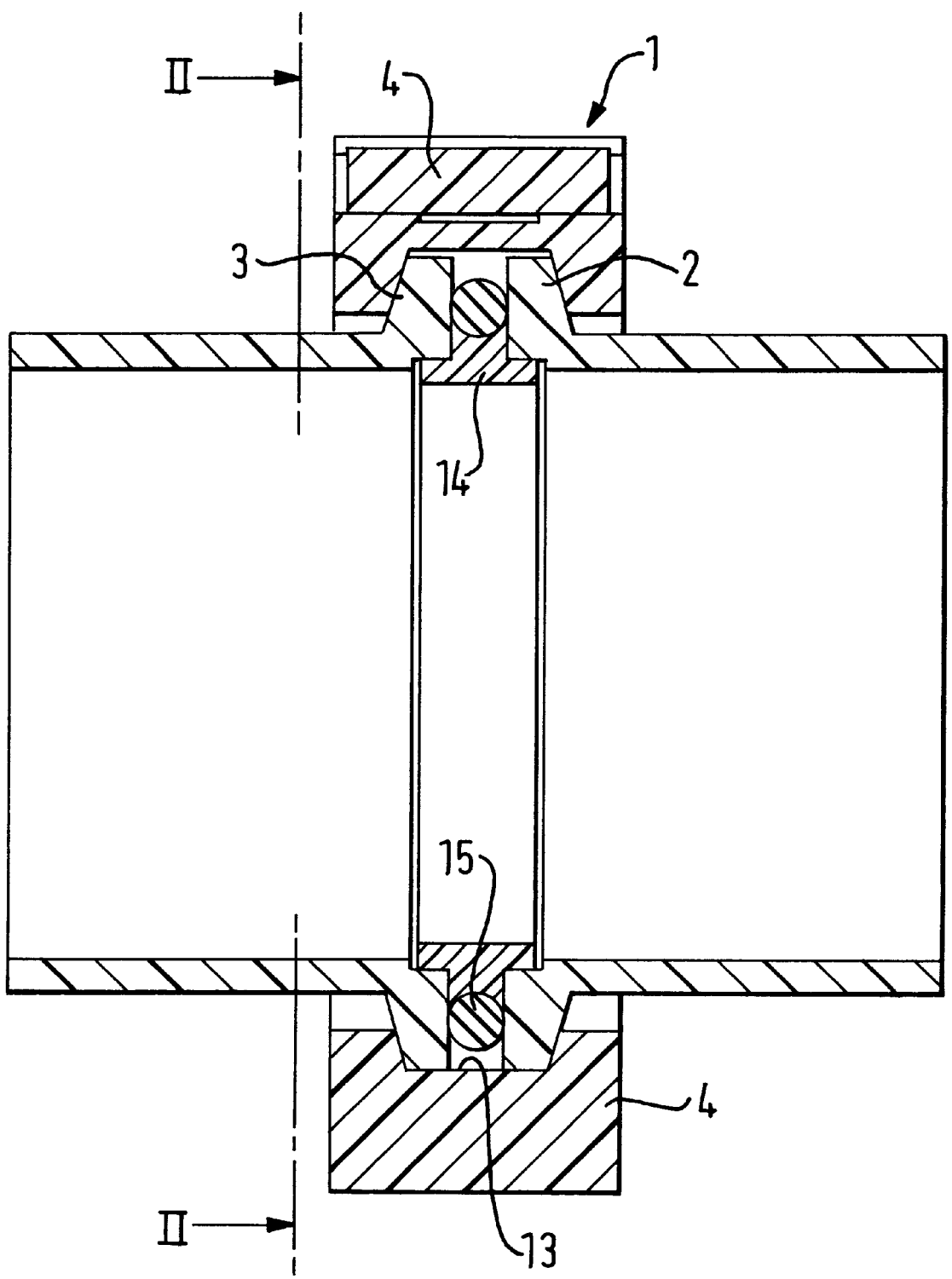
FIG. 1 is a schematic cross-section through a flange clamp of the invention and showing two pipe flanges being connected by the clamp.

The invention is concerned with the provision of a flexible clamp which enables a user to adjust quickly and easily the length of the chain without special tooling thereby enabling the clamp to be used on different sizes of flanges.

According to the invention, a flexible clamp comprises a plurality of links, each link being a snap-fit with the next adjacent link thereby permitting a user to alter the length of the chain by the addition or subtraction of one or more links, and means for latching the free ends of the chain together.

In preferred embodiments, each link of the clamp is substantially identical in shape and size to the other links; in addition the links are preferably made from plastic material, for example nylon. The plastic material may be reinforced with glass or fibres, for example a 30% glass fill.

The latching means advantageously is a latch which includes a wire strap having a pin at one end, the opposite end co-operating with a member formed with a plurality of space grooves, each groove being dimensioned to receive the opposite end.

In preferred embodiments, each link of the clamp has a slot of a shape and size for receiving a portion of the flange of each pipe being connected by the clamp in the manner of a "saddle" about the flanges.

In such embodiments and generally, a spacer ring is preferably positioned between the flanges so as to separate the flanges axially and allow a circular "O" ring seal to be positioned between the flanges in some tension, thereby sealing the gap between the flanges.

The links preferably each have a pin portion which can be received and retained in a co-operating groove portion of an adjacent link such that the co-operating pin/groove couplets allow the clamp to be formed from component links, preferably by a "snap-fit" action.

In preferred embodiments, the links possess a groove for receiving the pipe flanges which is positioned in the middle of the slot for receiving the pin portion of the adjacent link.

For a better understanding of the invention reference will now be made, by way of exemplification only, to the accompanying drawings.

With reference to the drawings, there is shown a flexible clamp 1 for securing together the flanges 2, 3 of two opposed pipes and comprising a plurality of substantially identical plastics links 4. Each link 4 has a "snap-fit" connection with its adjacent links in that it includes a pin portion 5 which is received with a snap-fit within a co-operating groove 6 formed in the next adjacent link. Likewise, each link has a groove 6 which receives a pin portion 5 of a next adjacent link 4. The pin and groove arrangement allows for complete flexibility of the chain clamp 1 in terms of the required length of the clamp to suit the size of the flanges being connected.

A latch 7 is provided for latching together the free ends of the chain clamp 1. The latch 7 includes, as shown, a rectangular wire strap 9 having a pin portion 8 moulded at one end which is a snap-fit within the groove 6 of one end link 4 in the same manner as the snap-fit connection between the pin portions 5 and the grooves 6. The opposite end of the strap 9 latches in to one of a plurality of space grooves 10 formed in a co-operating member 11 attached to the opposite end link 4 again by a snap-fit connection between a pin portion 12 and a corresponding groove in the co-operating member 11.

Figure 2:
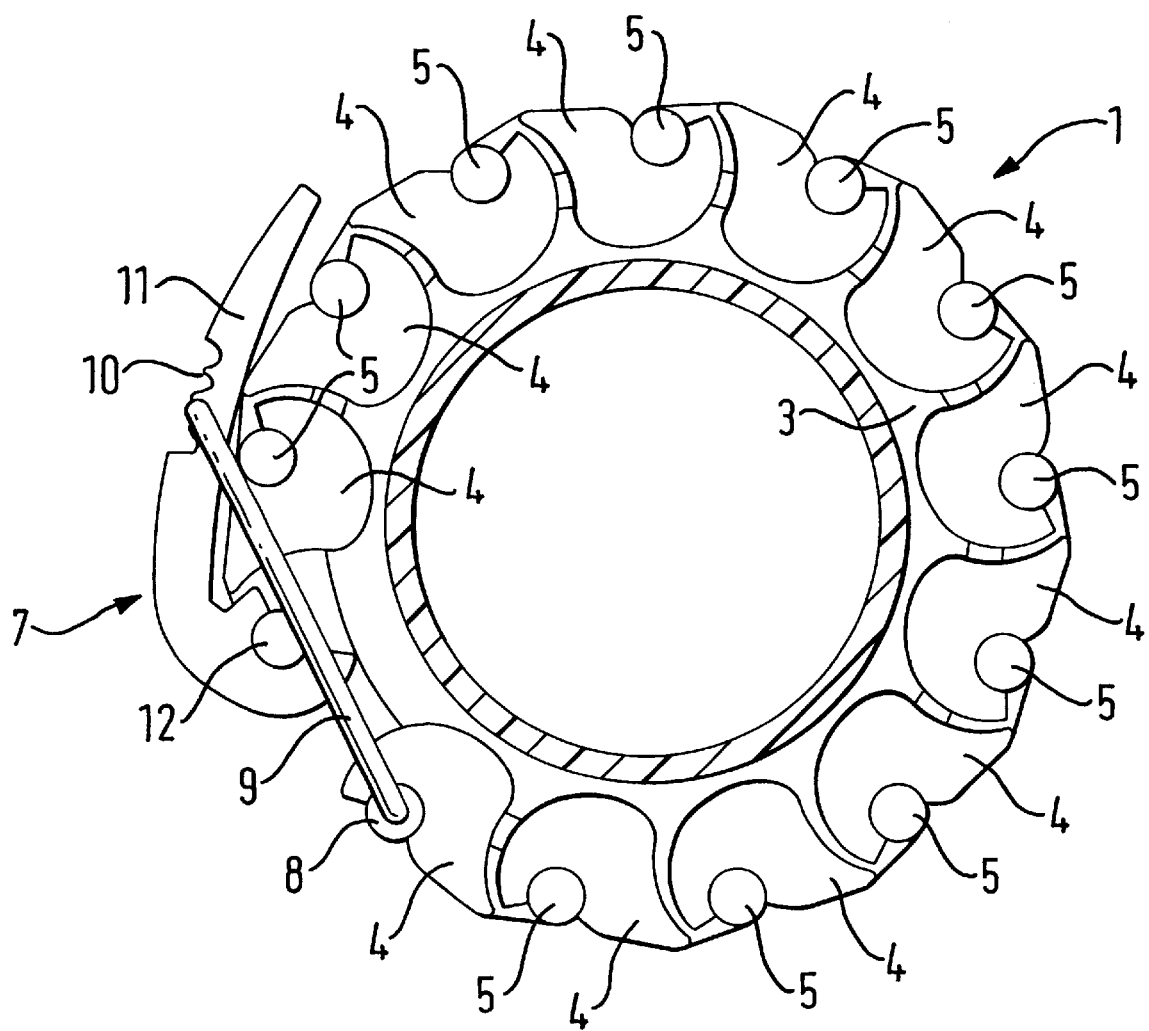
FIG. 2 is a schematic side view of the clamp/pipe flange arrangement of FIG. 1 along the line II—II of FIG. 1.
Figure 3:
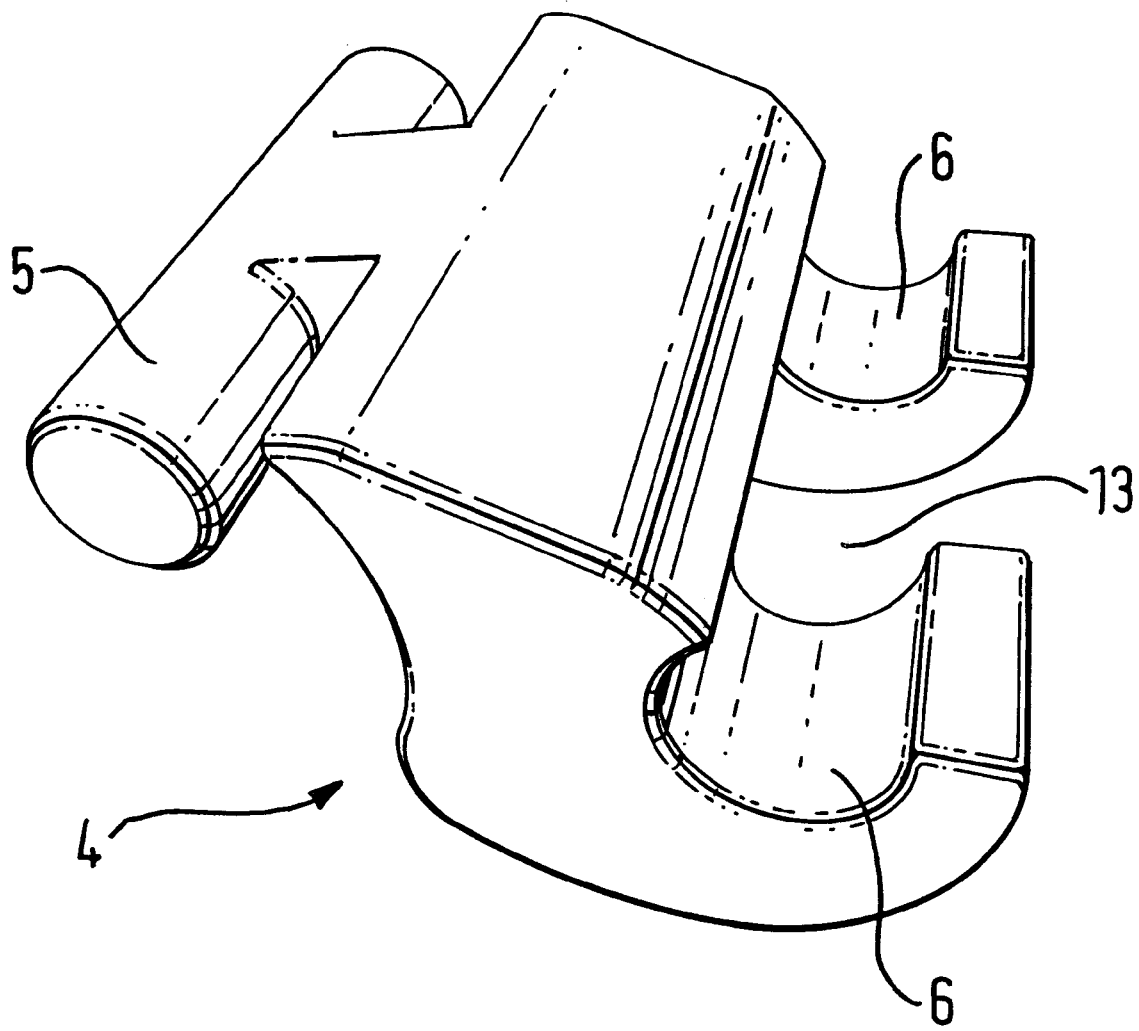
FIG. 3 is a perspective view of a single link of the flange clamp of FIGS. 1 and 2.

The latch 7 is operated by placing the end of the strap 9 remote from the pin portion 8 in to the selected space groove 10 and tensioning the latch 7 by rotation of the co-operating member 11 about the pin portion 8 so that it assumes the position shown in FIG. 2.

Each link 4 of the clamp has a slot 13 for receiving the flanges 2, 3 of the pipes being connected. The use of a spacer ring 14 of "T" shaped cross-section allows the presence of an "O" ring 15 between the flanges 2, 3 under tension and therefore sealing the gap between the flanges. The links 4 of the clamp 1, and the clamp 1 overall, therefore sit in "saddle" fashion about the flanges 2, 3 with the whole arrangement being kept tensioned by means of the latch mechanism described above. The tapered shape of the walls of the slot 13 assists in keeping the clamp tightly around the flanges 2, 3.

An advantage of the flexible multi-component clamp 1 described in this embodiment is that the user can assemble together as many links 4 as are appropriate for fitting to the flanges 2, 3 of pipes to be connected. The "snap-fit" concept allows the user to shorten or increase very quickly the length of the clamp 1 without any special tooling to fit a particular size of flange.

In a preferred embodiment the links are made from nylon with a 30% glass fill.

I claim:

1. A flexible clamp comprising a plurality of plastic links, each one of the plurality of plastic links, comprising:

a body portion, a pin extending from one side of the body portion, and a groove at another side of the body portion, wherein the groove of the body portion is sized and shaped to receive and maintain the pin from another one of the plurality of links in snap-fit releasable engagement for pivotal co-operation between the pin and the groove, thereby permitting alteration of a length of the flexible clamp by addition or subtraction of at least one of the links; and means for latching together free ends of the flexible clamp.

2. The flexible clamp according to claim 1, wherein each one of the plurality of links are substantially identical in shape and size to the other links.

3. The flexible clamp according to claim 1, wherein the links are made from nylon.

4. The flexible clamp according to claim 1, wherein the links are made from plastic material reinforced with a material selected from the group consisting of glass and fibres.

5. The flexible clamp according to claim 1, wherein the latching means comprises:

a latch; a wire strap having first and second ends and a retaining pin at the first end for being releasably received in a groove of one of the plastic links; and a tensioning member formed with a plurality of spaced grooves, each one of the grooves being dimensioned to receive the second end of the wire strap.

6. The flexible clamp according to claim 1, wherein each one of the links further comprises a slot adjacent the groove and of a shape and size for receiving a portion of a pipe flange of each pipe being connected by the flexible clamp.

* * * * *